United States Patent
Hwang et al.

(10) Patent No.: US 7,301,257 B2
(45) Date of Patent: Nov. 27, 2007

(54) MOTION ACTUATOR

(75) Inventors: Ing-Shouh Hwang, Taipei (TW); En-Te Hu, Taipei (TW); Kuang-Yuh Huang, Taipei (TW)

(73) Assignee: Academia Sinica, Taipei (TW)

( * ) Notice: Subject to any disclaimer, the term of this patent is extended or adjusted under 35 U.S.C. 154(b) by 90 days.

(21) Appl. No.: 11/249,477

(22) Filed: Oct. 14, 2005

(65) Prior Publication Data

US 2007/0085450 A1   Apr. 19, 2007

(51) Int. Cl.
*H02N 2/00* (2006.01)
*H02N 41/09* (2006.01)

(52) U.S. Cl. .............. 310/317; 310/323.17; 310/323.01

(58) Field of Classification Search ................................. 310/323.01–323.04, 323.09, 323.17, 328, 310/333, 317
See application file for complete search history.

(56) References Cited

U.S. PATENT DOCUMENTS

| | | | | |
|---|---|---|---|---|
| 3,246,608 | A * | 4/1966 | Cooper ........................ | 104/134 |
| 3,504,206 | A * | 3/1970 | Fritsch ........................ | 310/21 |
| 4,453,103 | A * | 6/1984 | Vishnevsky et al. ... | 310/323.02 |
| 4,613,782 | A * | 9/1986 | Mori et al. ............. | 310/323.16 |
| 4,912,351 | A * | 3/1990 | Takata et al. .......... | 310/323.16 |
| 5,216,313 | A * | 6/1993 | Ohinishi et al. ........ | 310/323.16 |
| 6,954,023 | B2 * | 10/2005 | Hata et al. ................... | 310/328 |
| 6,977,461 | B2 * | 12/2005 | Hendriks et al. ........... | 310/328 |
| 7,095,160 | B2 * | 8/2006 | Uchino et al. .............. | 310/333 |
| 2005/0127787 | A1 * | 6/2005 | Biegelsen et al. .......... | 310/328 |

FOREIGN PATENT DOCUMENTS

| | | | |
|---|---|---|---|
| DE | EP-0823738 A2 * | 2/1998 | |
| JP | 1-303361 | * 12/1989 | ................. 310/328 |

OTHER PUBLICATIONS

S. H. Pan et. al.; *³He refrigerator based very low temperature scanning tunneling microscope;* Feb. 1999, American Institute of Physics, vol. 70, No. 2, pp. 1459-1463.

* cited by examiner

*Primary Examiner*—Thomas M. Dougherty
(74) *Attorney, Agent, or Firm*—Bacon & Thomas PLLC

(57) ABSTRACT

The present invention provides a shear motion driven motion actuator. The motion actuator provides a plurality of driving modes to drive a main body, including the inertial drive mode, the friction drive mode and the scanning mode. The motion actuator comprises a base having a V-shape concave groove and a main body having a V-shape convex. A plurality of piezoelectric elements is provided on the base to drive the main body using the shearing deformation force of the piezoelectric elements. The present invention also provides motion control using a variety of driving modes to achieve stable, high resolution and linear driving of the main body along the base.

13 Claims, 2 Drawing Sheets

MOTION ACTUATOR

FIELD OF THE INVENTION

The present invention relates to a motion actuator, especially to a multi-mode piezoelectric motion actuator.

BACKGROUND OF THE INVENTION

The piezoelectric motion actuator is a motion actuator that provides positioning control with a resolution of the nanometer level. The piezoelectric motion actuator may be used in all kinds of nano-level motion control, nanofabrication and nano-handling. Under the existing technologies, some piezoelectric motion actuator may provide positioning control at the sub-nanometer level.

There are typically three types of driving mode for linear motors using piezoelectric motion actuator. They are the inchworm, the inertial drive and the frictional drive. An inchworm consists of a pair of clampers, a stretcher and a shaft. The clampers are used to clamp the shaft and the stretcher generates a displacement motion to the shaft to drive the shaft. By running the inchworm with a succession of clamp-stretch-unclamp-unstretch cycles, an incremental linear movement with a step size of submicron or smaller may be generated.

In the inertial drive mode, there are two different operation principles. One is the "impact drive" which consists of a main body, an actuator, an inertial mass and a guiding surface. The main body is positioned on a guiding surface. The main body and the inertial mass are attached on two ends of the actuator, with the inertial mass not contacting the surface. The actuator makes a slow extension followed by a rapid contraction. The impulsive inertial force results in a step-like and backlash-free movement of the main body. The other driving principle is the "stick-slip-effect" drive, which consists of a main body, a base piece, shear motion piezoelectric elements in between and a mechanism that provides a preloading force for the above elements. The main body is first moved slowly in one direction relative to the base piece by deforming the piezoelectric elements (stick). Then the piezoelectric elements are undeformed suddenly and the main body remains almost unmoved (relative to the base piece) due to its large inertia being able to overcome the small frictional force (slip). In this manner, the main body makes a step-like linear motion relative to the base piece by repeatedly driving the piezoelectric elements with the same cycle. The theoretical resolution of the inertial drive is less than 1 nm, while its experimental resolution depends on the mass and the interface of the contacting surfaces. The mechanical structure of the inertial drive is simple, compact and easy to fabricate, while its major drawback is the small carry mass if the linear motion is in the vertical direction.

A friction drive drives a main body in a way different from that of the inertial drive. The piezoelectric elements deform sequentially and later undeformed simultaneously. When all the piezoelectric elements undeform, the friction force drives the main body to move a short distance. Pan et al. proposed a friction motion actuator having six piezoelectric elements which hold a triangular shaft in position. See S. H. Pan et al., "The refrigerator based very low temperature scanning tunneling microscope", Review of Scientific Instruments, Vol. 70, pp 1459-1463, February 1999. To move one step, the six elements are deformed in sequence along the axial direction of the shaft and are undeformed simultaneously to drive the shaft. The step size of the friction drive is 200 nm at room temperature and is about 30 nm at temperature below 4K. The entire structure of the friction drive is rigid and stable. It can carry a load of several kilograms when the linear motion is along the vertical direction. Its walking speed, however, is slow and the structure is tedious to build.

OBJECTIVES OF THE INVENTION

The objective of this invention is to provide a novel motion actuator.

Another objective of this invention is to provide a simplified, easy to fabricate and high speed motion actuator.

Another objective of this invention is to provide a motion actuator that is able to drive a main body in a plurality of drive modes.

Another objective of this invention is to provide a motion actuator that is able to drive a heavy load.

Another objective of this invention is to provide a motion actuator that is able to provide positioning control at the sub nanometer level.

SUMMARY OF THE INVENTION

The present invention provides a shear motion driven motion actuator. The motion actuator provides a plurality of driving modes to drive a main body, including the inertial drive mode, the friction drive mode and the scanning mode. The motion actuator comprises a base having a V-shape concave groove and a main body having a V-shape convex. A plurality of piezoelectric elements is provided on the base to drive the main body using the shearing deformation force of the piezoelectric elements.

The present invention also provides motion control using a variety of driving modes to achieve stable, high resolution and linear driving of the main body along the base.

The above and other objectives and advantages of this invention may be clearly understood from the detailed description by referring to the following drawings.

Table I shows the experimental measurement of the performance of the motion actuator of this invention.

DETAILED DESCRIPTION OF THE INVENTION

Figure 1:
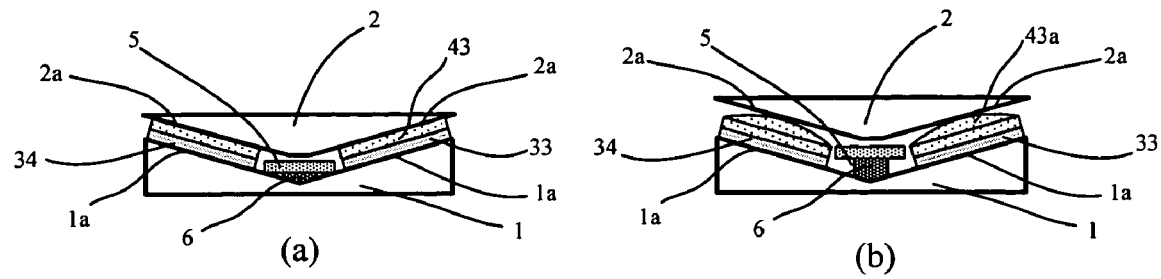
FIG. 1(a) shows the front view of the motion actuator of the present invention.
FIG. 1(b) shows the front view of the motion actuator of the present invention, when spherical contact pads are used.

Now refer to FIG. 1(a), which is the front view of the motion actuator of the present invention. As shown in FIG. 1(a), the motion actuator of this invention comprises a base 1 and a main body 2. A V-shape concave guiding groove 1a is provided in the base 1 and a V shape convex 2a is provided in the main body 2. The motion driving device includes 4 piezoelectric elements 31, 32, 33 and 34, provided at both sides of the guiding groove 1a relative to the lowest position of the concave. Each side of the guiding groove 1a has two piezoelectric elements.

Shape of the guiding groove 1a is of course not limited to V shape. Any type of guiding groove that may guide the main body to move linearly, such as dovetail groove, triangular groove etc. may be applicable in this invention. Motion driving devices applicable in this invention are not limited to piezoelectric elements. Other elements that may deform and undeform as desired according to control signals as given may be used in this invention as motion driving devices. In addition, number of driving elements is not limited to 4. It is possible to use less than or more than 4 driving elements to provide same or similar functions. However, as this invention provides multiple mode driving functions, it is recommended that 4 or more motion driving elements are used. It is also recommended that the driving elements are aligned on the guiding groove in a symmetric manner.

Figure 2:
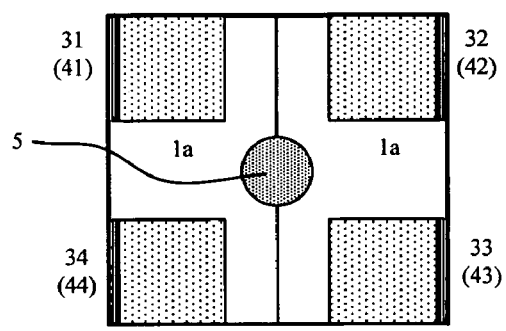
FIG. 2 shows the top view of the motion actuator of the present invention when the main body is removed.

At the bottom of the concave of the guiding groove 1a, a magnetic element 5 is provided and is affixed to the base 1 through an adjusting screw 6. The height of the magnetic element 5 may be adjusted by the adjusting screw 6. At both sides of the V-shape convex 2a, at positions corresponding to the piezoelectric elements 31-34, provided are 4 contact pads 41, 42, 43 and 44. Material for the contact pads 41-44 may be ceramic, plastic or metal or any other endurable material that may separate the piezoelectric elements 31-34 and the taper surface of the V-shape convex 2a and define the relative position between the V-shape convex 2a and the V-shape guiding groove 1a may be used in this invention. The contact pads 41-44 as shown in FIG. 1(a) are plates. This, however, is not any limitation. The contact pads 41-44 may be spherical, arc shape, cone shape etc. and its contact with the piezoelectric elements 31-34 may be a plane, a line or points. In this invention, it is recommended that planar or spherical contact pads are used. FIG. 1(b) shows the front view of the motion actuator of the present invention, when spherical contact pads are used. FIG. 2 shows the top view of the motion actuator of the present invention, while the main body is removed.

The interface between the piezoelectric elements 31-34 and the contact pads 41-44 needs to be smooth, when the contact pads 41-44 are positioned on the piezoelectric elements 31-34 by any applicable means. The height of the contact pads 41-44 shall be uniform, so to maintain the main body 2 stably. If the contact pads are plates, they preferably are flat and have a uniform thickness. Material of the contact pads 41-44 may be ceramics, so to be endurable and thus precise motion control may be achieved. It is highly recommended that shear mode piezoelectric plates are used as the piezoelectric elements 31-34 of this invention. The piezoelectric elements 31-34 are fixed to the walls of the V-shape groove 1a with any suited means. The base 1 may be prepared with metal, ceramics or other durable materials. The walls of the V-shape groove 1a are polished to obtain desired smoothness. The main body 2 may be prepared with metal, ceramics or other endurable material, while it should be permeable or a permeable material is attached to the main body so to be attracted by the magnetic element 5. The surface of the convex 2a is also polished to ensure smoothness. The thickness of all the piezoelectric elements 31-34, as well as that of all the contact pads 41-44, is preferably uniform through out the whole area, with a tolerance of less than 1% of their thickness, so that precise positioning may be obtained. Adjust the height of the adjusting screw 6, such that the contact surfaces of the piezoelectric elements 31-34 and the contact pads 41-44 are closely attached to each other.

A control circuit (not shown) may be used in this invention to control the operation of the piezoelectric elements. The control circuit can send out signals with an adjustable voltage and an adjustable frequency to conduct the inertial drive control, the friction drive control or the scanning control. The driving modes of this invention will be described hereinafter.

Figure 3:
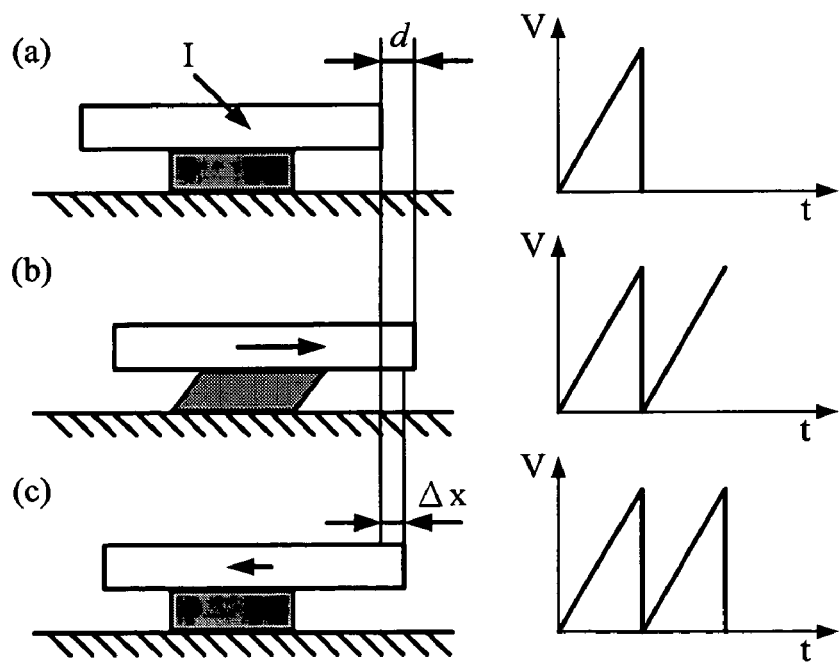
FIG. 3 shows the relation between steps in inertial drive mode and control voltage as used, of the motion actuator of this invention.

FIG. 3 shows the relation between steps in the inertial drive mode and the control voltage as used, of the motion actuator of this invention. As shown in this figure, in step (a), a piezoelectric element carries a mass I. In step (b) a gradually increased voltage is applied to the piezoelectric element to cause deformation of the piezoelectric element, whereby the mass moves a distance of d. In step (c) the voltage drops suddenly and the piezoelectric element is undeformed. At this step the mass is shifted to left side of the figure by a very short distance, due to the inertia of the mass and the small friction force. As a result, the mass moves a net distance of $\Delta x$ as one step.

Figure 4:
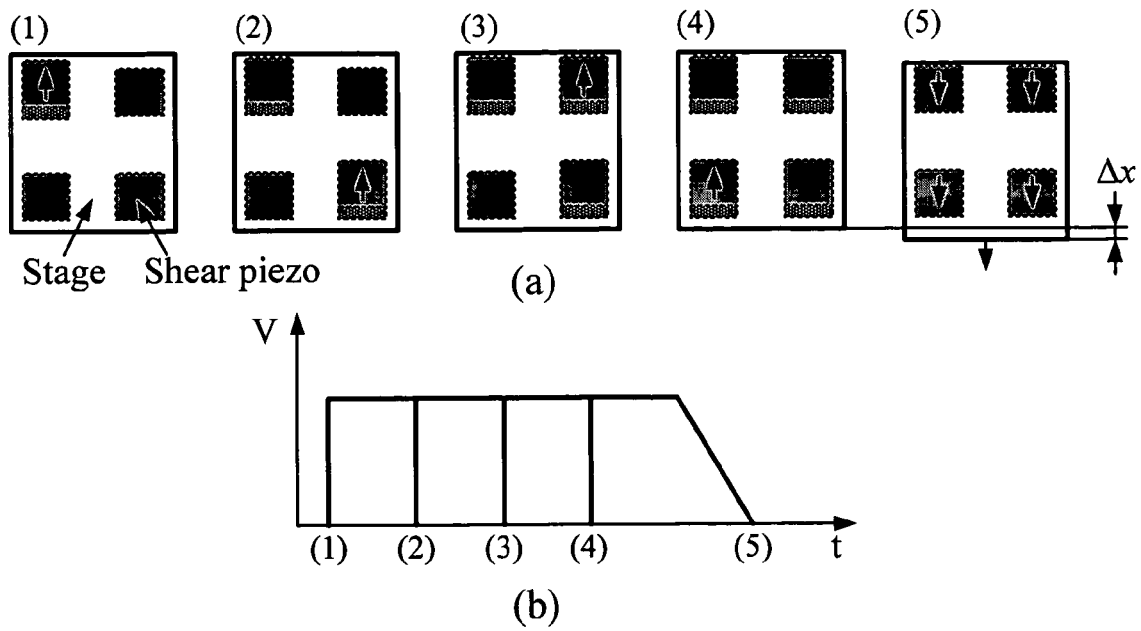
FIG. 4 shows the operation principle of the friction drive mode of the motion actuator of this invention, wherein (a) shows driving steps of the friction driving mode and (b) shows the corresponding control voltage.

FIG. 4 shows the operation principle of the friction drive mode of the motion actuator of this invention, wherein (a) shows driving steps of the friction driving mode and (b) shows the corresponding control voltage. As shown in this figure, at step 1 a sudden rise voltage is applied to the first piezoelectric element 31 to cause a shear deform of the element. At this step, because the sum of the inertia of the main body 2 and the friction force between other piezoelectric elements 32-34 and the convex surface 2a of the main body 2 is far greater than the friction force between the first piezoelectric element 31 and its contact surface with the main body 2, the main body 2 is not moved. At steps 2, 3 and 4, sudden rises of voltage are then supplied to the second, third and fourth piezoelectric elements 32-34 in sequence to deform the piezoelectric elements. The main body 2 does not move all the same. Thereafter, at step 5, all voltages applied to the piezoelectric elements decrease to zero gradually, whereby all piezoelectric elements 31-34 undeform simultaneously. The main body 2 is thus carried by the piezoelectric elements to move a distance of $\Delta x$.

Figure 5:
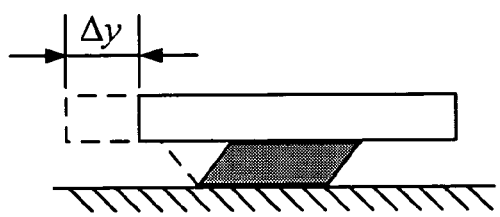
FIG. 5 shows the operation principle of the scanning mode of the motion actuator of this invention.

FIG. 5 shows the operation principle of the scanning mode of the motion actuator of this invention. As shown in this figure, when the piezoelectric element is supplied a voltage, the shear deformation of the piezoelectric element carries the main body to move at a controlled distance in the shearing direction of the piezoelectric elements.

Figure 6:
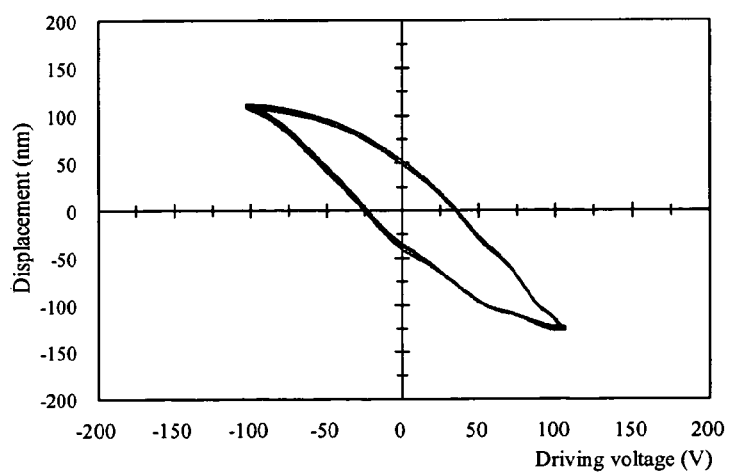
FIG. 6 shows the relation between voltage supplied to piezoelectric element and distance of displacement of the main body, in the scanning mode of the motion actuator of this invention.

FIG. 6 shows the relation between voltage applied to piezoelectric element and distance of displacement of the main body, when the scanning mode of the motion actuator of this invention is used. In this figure, weight of the main body is 4.5 g. As shown in this figure, the displacement resolution can be higher than 0.1 A. The largest displacement range is ±120 nm, when a voltage of ±180V is applied. The displacement can be larger if piezo-stacks are used. The scanning mode does not function as linear motor but is useful in precise positioning of the main body. It may also be used as driving element for scanning probe in a scanning probe microscope.

Table I shows the experimental measurement of the performance of the motion actuator of this invention. As shown in this table, in the friction mode the maximum step size of this invention is 90 nm under 10 g payload and is 3 nm under a payload of 500 g. The maximum speed of the inertial mode is about 280 μm/sec, when the payload is 4.5 g.

TABLE I

| Mode | Inertial drive | Friction drive | Scanning |
|---|---|---|---|
| Maximum step size (nm) | 45 @ 70 V | 90 @ 200 V | — |
| Minimum step size (nm) | 7 @ 40 V | 3 @ 200 V | — |
| Maximum working frequency (Hz) | 8K | 100~1K | <100 |
| Maximum speed (μm/s) | 280 | 4 | — |
| Maximum horizontal load (g) | 300 | 500 | — |
| Driving voltage (V) | 40~70 | 100~200 | ±200 |

The control device of the present invention may actuate a combination of steps to include different or same driving modes of the inertial driving mode, the friction driving mode and the scanning mode. For example, when the main body needs to be moved rapidly, it may be driven under the inertial mode at a higher frequency, such that it can reach the goal position in a short time. If the main body needs to carry a large mass, the friction driving mode may be selected, such that the main body moves at a lower speed. The scanning mode provides fine positioning or scanning function at a constant position. With the combination of these modes, the motion actuator satisfies a variety of needs in motion and position control.

As the present invention has been shown and described with reference to preferred embodiments thereof, those skilled in the art will recognize that the above and other changes may be made therein without departing form the spirit and scope of the invention.

What is claimed is:

1. A motion actuator comprising:
a main body;
a base piece to allow said main body to move along its upper surface;
a preloading mechanism to provide preload to slidably connect said main body and said base piece;
a plurality of motion drivers, positioned in between said main body and said base piece, to generate a deformation in response to a control signal so to drive said main body to move a tiny distance in relation to said base piece accordingly; and
a controller to generate control signals and to separately or simultaneously provide said control signals to said plurality of motion drivers;
wherein said controller provides tunable voltages to said motion drivers in a controlled manner to drive said main body to move in at least two selective modes selected from the group consisting of a scanning mode, an inertial driving mode and a frictional driving mode.

2. The motion actuator according to claim 1, wherein said motion driver is piezoelectric element.

3. The motion actuator according to claim 2, wherein said motion driver is shear motion piezoelectric element.

4. The motion actuator according to claim 1, wherein number of said motion driver is at least 3.

5. The motion actuator according to claim 4, wherein number of said motion driver is at least 4.

6. The motion actuator according to claim 5, wherein number of said motion driver is at least 6.

7. The motion actuator according to claim 1, wherein said base piece comprises a V shape concave guiding groove and said main body comprises a V shape convex.

8. The motion actuator according to claim 7, wherein said motion drivers are provided in both side walls of said V shape concave guiding groove.

9. The motion actuator according to claim 8, wherein number of said motion drivers is an even number and all said motion drivers are on the two side walls of said guiding groove in a symmetric manner.

10. The motion actuator according to claim 1, wherein said preloading mechanism comprises a magnet.

11. The motion actuator according to claim 1, wherein in said scanning mode said controller provides a tunable voltage to all said motion drivers simultaneously, so to generate shear deformation of said motion drivers simultaneously in order to drive said main body to move in a scanning manner.

12. The motion actuator according to claim 1, wherein in said frictional driving mode said controller provides a gradually increasing voltage to all said motion drivers simultaneously, so to generate shear deformation of said motion drivers simultaneously in order to drive said main body to move in a distance and then decreases said voltage to zero simultaneously to undeform said motion drivers.

13. The motion actuator according to claim 1, wherein in said inertial driving mode said controller provides a voltage to said motion drivers in sequence, so to generate shear deformation of said motion drivers in sequence and then decreases said voltage to zero simultaneously in order to drive said main body to move in a distance.

* * * * *